Apr. 17, 1923.  
F. M. LEWIS  
APPARATUS FOR CUTTING TOOTHED GEARS  
Filed Aug. 23, 1920  
1,452,121  
2 Sheets-Sheet 1

INVENTOR  
F. M. Lewis,  
BY H. R. Kerslake  
ATTORNEY

Apr. 17, 1923.  
F. M. LEWIS  
1,452,121  
APPARATUS FOR CUTTING TOOTHED GEARS  
Filed Aug. 23, 1920  
2 Sheets-Sheet 2
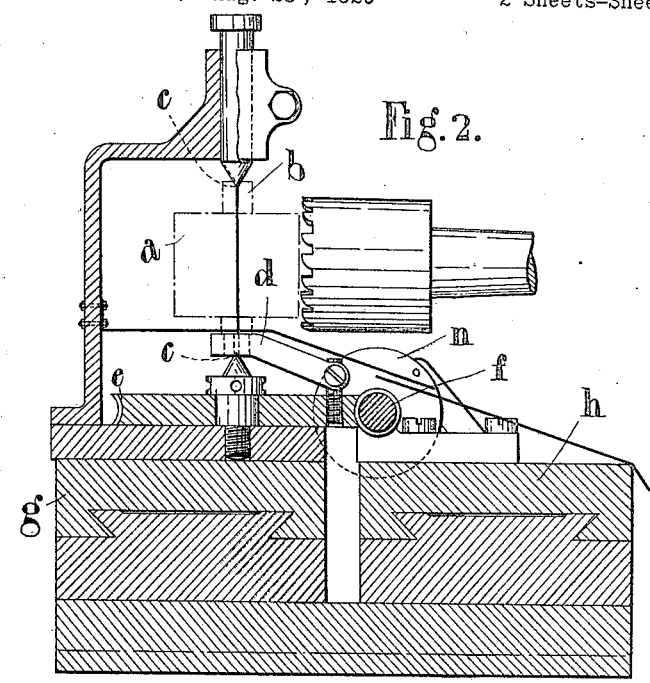
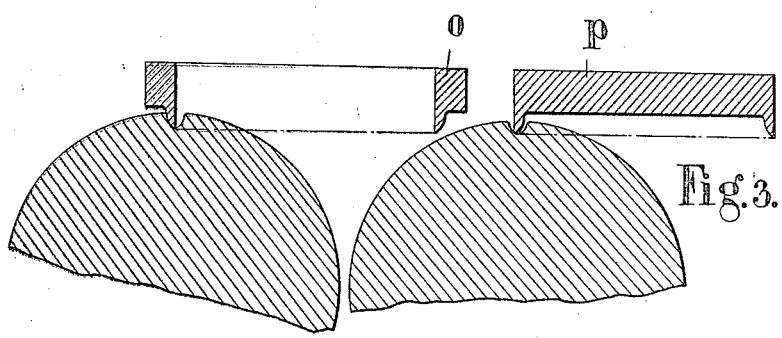
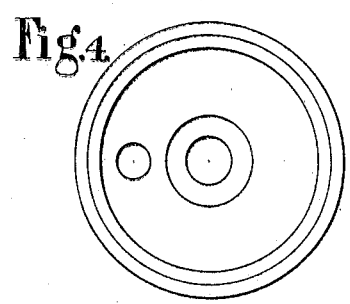
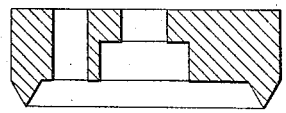
INVENTOR  
F. M. Lewis,  
BY H. R. Kerslake  
ATTORNEY Patented Apr. 17, 1923.

1,452,121

UNITED STATES PATENT OFFICE.

FRANK MICHAEL LEWIS, OF LONDON, ENGLAND.

APPARATUS FOR CUTTING TOOTHED GEARS.

Application filed August 23, 1920. Serial No. 405,332.

*To all whom it may concern:*

Be it known that I, FRANK MICHAEL LEWIS, of 16 Lupus Street, Pimlico, London, S. W. 1, England, a subject of the King of Great Britain and Ireland, have invented certain new and useful Improved Apparatus for Cutting Toothed Gears, of which the following is a specification.

This invention relates to the forming of toothed gears having curved or arcuate teeth by a method of generation which involves the cutting of the teeth by means of a cutter rotating in a path extending across the face of the blank about an axis lying in a plane to which the axis of the blank is perpendicular and having a rolling movement relatively to the blank about an axis other than its axis of rotation.

Various methods of generation and various forms of apparatus for carrying out such methods have hitherto been proposed, but so far as I am aware they have none of them been entirely satisfactory in practice for the reason that with the methods hitherto proposed it was impossible to obtain a correct tooth form such as is necessary for the proper and efficient intermeshing of the gears to secure smooth and silent running.

It is the object of my invention to obviate the disadvantages of the hitherto known methods of teeth generation and to produce improved apparatus for carrying out my improved method.

The accompanying drawings illustrate one convenient form of apparatus for carrying out the invention.

Figure 2 is a sectional elevation, and

Figure 3 is a diagrammatic view showing one arrangement of cutters.

Figures 4 and 5 are views illustrating a modified form of cutter.

Figure 1:
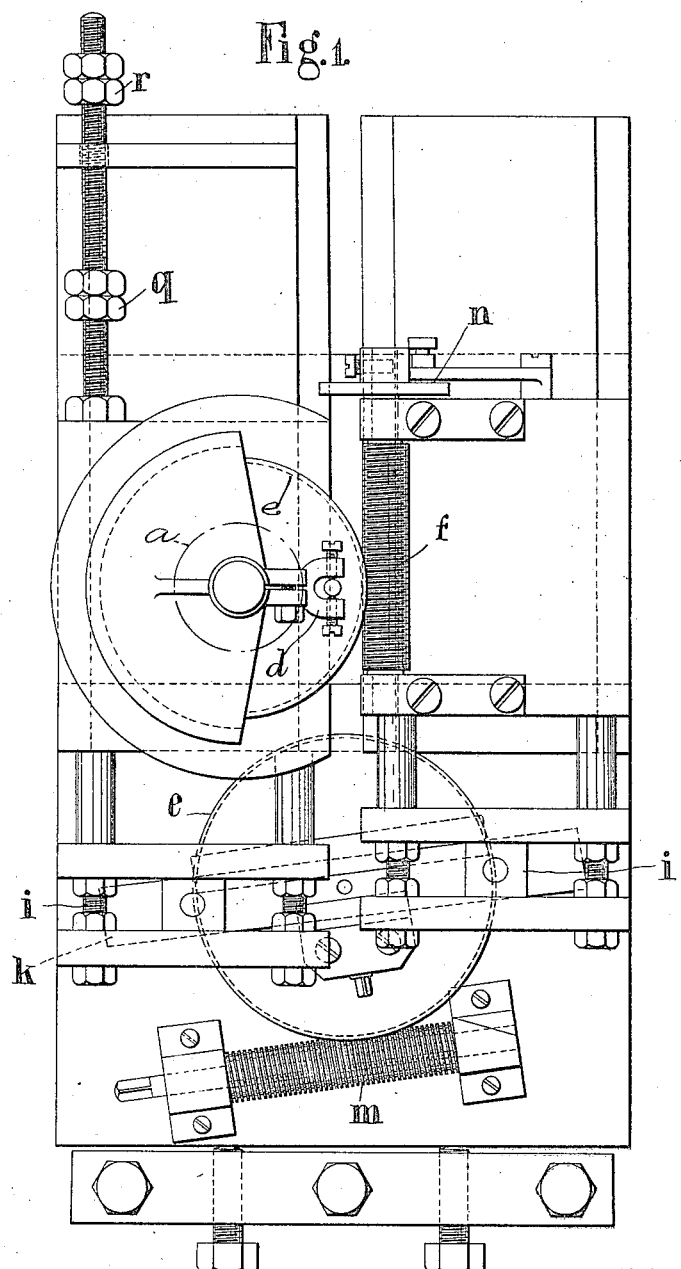
Figure 1 is a plan.

In carrying my invention into effect in one convenient manner I arrange the work blank $a$ upon a mandril or holder $b$ which may be held between centres $c$ or be otherwise suitably supported, the work holder being connected by a carrier $d$ or other suitable means to a worm wheel $e$, the axis of which is coincident with the axis of the work mandril and which is adapted to engage a suitable worm $f$. The worm wheel and work holder are mounted upon one slide $g$ and the worm is mounted upon a second slide $h$.

The slides carrying the worm and worm wheel are so arranged and are driven at such speeds that the rolling of the blank upon the cutter will occur on the base circle of the blank and by varying the speeds of the respective slides it will be possible to cut a blank of any diameter within the limits of the apparatus or a blank having any base circle, it being known that the base circle is a function of the pitch circle and the pressure angle of tooth so that a gear wheel having a definite pitch circle may have various base circles corresponding with various pressure angles of tooth.

In the example illustrated the slides $g$ and $h$ are connected to blocks $i$ which are carried upon a slide $k$ adapted to move in a direction transverse to the movement of the main slides, and being carried upon a rotary member $l$ adapted to be actuated by a worm $m$ or by a toggle link or other suitable mechanism, while means are provided for clamping the slide $k$ and in consequence the blocks $i$ in any desired position relatively to the centre of the rotary member $l$ so that the speeds of movement of the slides will be suitably chosen.

With a knowledge of the dimensions of the apparatus and of the blank to be cut, it is a matter of calculation to decide upon the relative speeds of travel of the slides and in order that the machine may be accurately set for any size blank or any size of base circle without making any separate calculation for each case, I may provide a scale in conjunction with an index mark upon the slide $k$ so that the latter may be approximately set.

If, for example,

D represents the diameter of the worm wheel $e$, $d$ = the diameter of the base circle required for the gear to be cut.

K = the distance between the centres of the blocks $i$, and $x$ = the distance between the centre of one block $i$ and the centre of the rotary member $l$.

Then $$\frac{d}{D} = \frac{x}{K}$$

From this equation the necessary setting of the scale can be effected in order to give the prescribed movements to the slides for any particular gear wheel to be cut.

For the purpose of indexing the blank.

that is, for successively rotating the blank for the purpose of cutting successive teeth, any suitable form of indexing device n may be employed and while this may be carried upon the work mandril it is preferable to arrange the indexing, as shown, in connection with the worm f carried upon the slide h, this arrangement being rendered possible by the adoption of the worm and worm wheel. It is for this reason that I prefer to employ a worm and worm wheel as track and rolling member, but it will be understood that a rack and pinion or any other equivalent may be adopted.

Apparatus for carrying out the invention may comprise a new machine as a whole or it may be formed as an attachment for existing machine tools of suitable form such as milling machines, lathes or the like, but in order that the correct form of tooth shall be produced, I combine with the rolling movement upon the base circle means whereby both flanks of each tooth will be cut to the same radius. This may be effected by employing two annular end mills for forming the tooth faces as shown, for example, at o and p in Figure 3 in which case the internal diameter of the end mill o for cutting one set of faces will be equal to the external diameter of the other end mill p for cutting the other set of faces. In place of such arrangement, however, the same effect may be produced by using a single tool suitably shaped as shown, for example, in Figures 4 and 5. It will be seen that as the angle of the cutter is less than twice the pressure angle of the involute the generation occurs at the point of the tool and thus both flanks of the tooth are cut to the same or very approximately the same radius.

It will be understood that with the arrangement above described, the tool will be fixed in space so that it will have no movement apart from its movement of rotation.

With suitable modifications but again involving the cutting of the tooth faces to the same radius the invention may be applied to the cutting of bevel gears. In the forming of such arcuate bevel gears the machine must be so designed and arranged that the blank rolls on the cutter so that each horizontal section rolls on its corresponding base circle, that is, the blank as a whole rolls on what may be termed its base cone, and again both flanks are cut to the same radius.

When dealing with mating gears having arcuate teeth and intended to run in one direction only, it is sufficient to cut the engaging faces of the mating gears to the same radius and is unnecessary to cut both flanks of each tooth of each gear to the same radius.

The invention is also applicable to the formation of racks, in which case the tool is set at a slight inclination to the work so that the non-cutting teeth will clear the work. The teeth of such a rack will be very slightly elliptical owing to the inclination of the tool, but this will not interfere with their proper co-operation with other gears in which the teeth are similarly arcuate, provided that in forming the gears for meshing with the rack, the cutter is inclined to the rolling track to the same extent as in cutting the rack.

Suitable means such as the housing k', (Figure 2), may be adopted for covering the worm f and work wheel e so that their operation will not be interfered with by the cutting particles falling thereon and adjustable stops q and r may be provided to limit the travel of the slides.

Having now described my invention, what I claim as new and desire to secure by Letters Patent is:—

1. Apparatus for cutting the teeth of toothed gears comprising means for holding a blank, a cutter for operating on said blank, rectilinearly, movable means for giving a relative rolling movement between said cutter and said blank, and means for varying the movement of said rectilinearly movable means in order to vary the relative speeds of the rotary and rectilinear movements.

2. Apparatus for forming toothed gears comprising a blank holder, a slide supporting said blank holder, a roller member on said slide, a second slide having a track thereon engaging said rolling member, a cutter adapted to rotate across the face of the blank and means for varying the relative speeds of movement of said slides.

3. Apparatus for forming toothed gears comprising means for holding a blank, a slide supporting said blank holding means, a worm wheel on said slide connected with said blank holder, a worm engaging said worm wheel, a slide supporting said worm, a cutter adapted to rotate across the face of the blank and means for varying the relative speeds of movement of said slides.

4. Apparatus for forming toothed gears comprising means for holding a blank, a slide supporting said blank holding means, a worm wheel on said slide connected with said blank holder, a worm engaging said worm wheel, a slide supporting said worm, a cutter adapted to rotate across the face of the blank, means for varying the relative speeds of movement of said slides and means for setting said slides for any desired relative speed of movement.

5. Apparatus for forming toothed gears comprising means for holding a blank, a slide supporting said blank holding means, a worm wheel rotatably mounted on said slide, a carrier connecting said blank holding means with said worm wheel, a worm engaging said worm wheel, a slide carrying said worm, means for reciprocating said slides, a cutter adapted to rotate across the face of the blank and means for varying the relative speeds of movement of said slides.

6. Apparatus for forming toothed gears comprising means for holding a blank, a cutter adapted to operate upon said blank, a slide supporting said blank holding means, a rolling member on said slide connected with said blank holding means, a track engaging said rolling member, a slide supporting said track, a third slide connected with the first mentioned slides and arranged transversely thereto and a rotary member carrying said third mentioned slide.

7. Apparatus for forming toothed gears comprising means for holding a blank, a cutter adapted to operate upon said blank, a slide supporting said blank holding means, a rolling member on said slide connected with said blank holding means, a track engaging said rolling member, a slide supporting said track, a third slide connected with the first mentioned slides and arranged transversely thereto, a rotary member carrying said third mentioned slide and means for varying the points of connection between the slides in relation to the centre of said rotary member.

8. Apparatus for forming toothed gears comprising means for holding a blank, a slide supporting said blank holding means, a rolling member on said slide connected with said blank holding means, a track engaging said rolling member, a slide supporting said track, a cutter adapted to operate upon said blank, means for varying the relative speeds of movement of said slides and means for indexing the blank carried by said track.

In testimony whereof I have signed my name to this specification.

FRANK MICHAEL LEWIS.